June 14, 1949.  H. A. MANOOKIAN  2,472,856
AIRPLANE
Filed Aug. 2, 1944  3 Sheets-Sheet 3
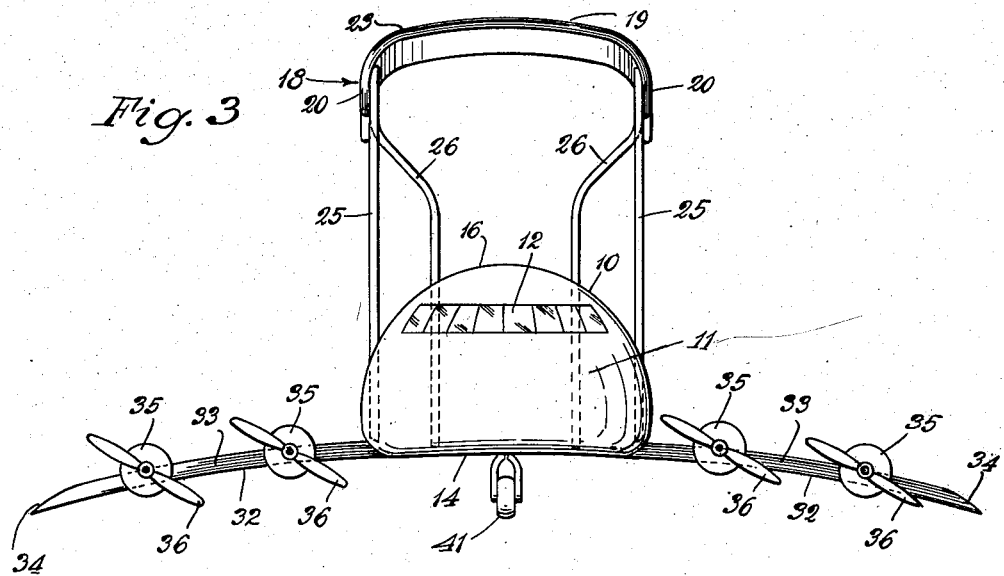
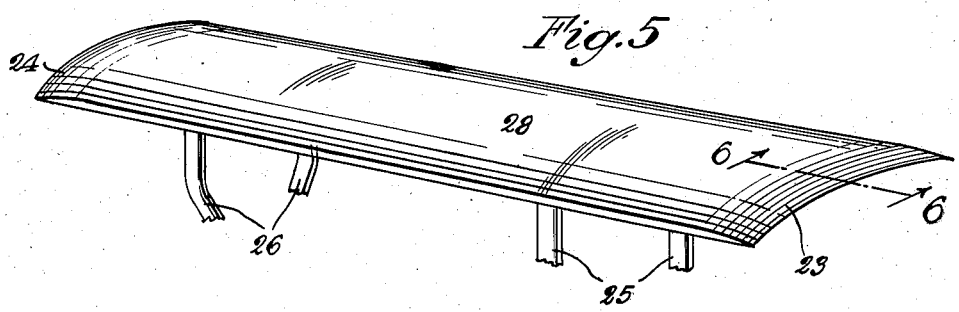
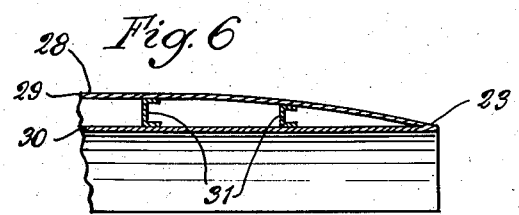
Inventor
Harry Alexan Manookian
by Joshua R. Potts
His Attorney.

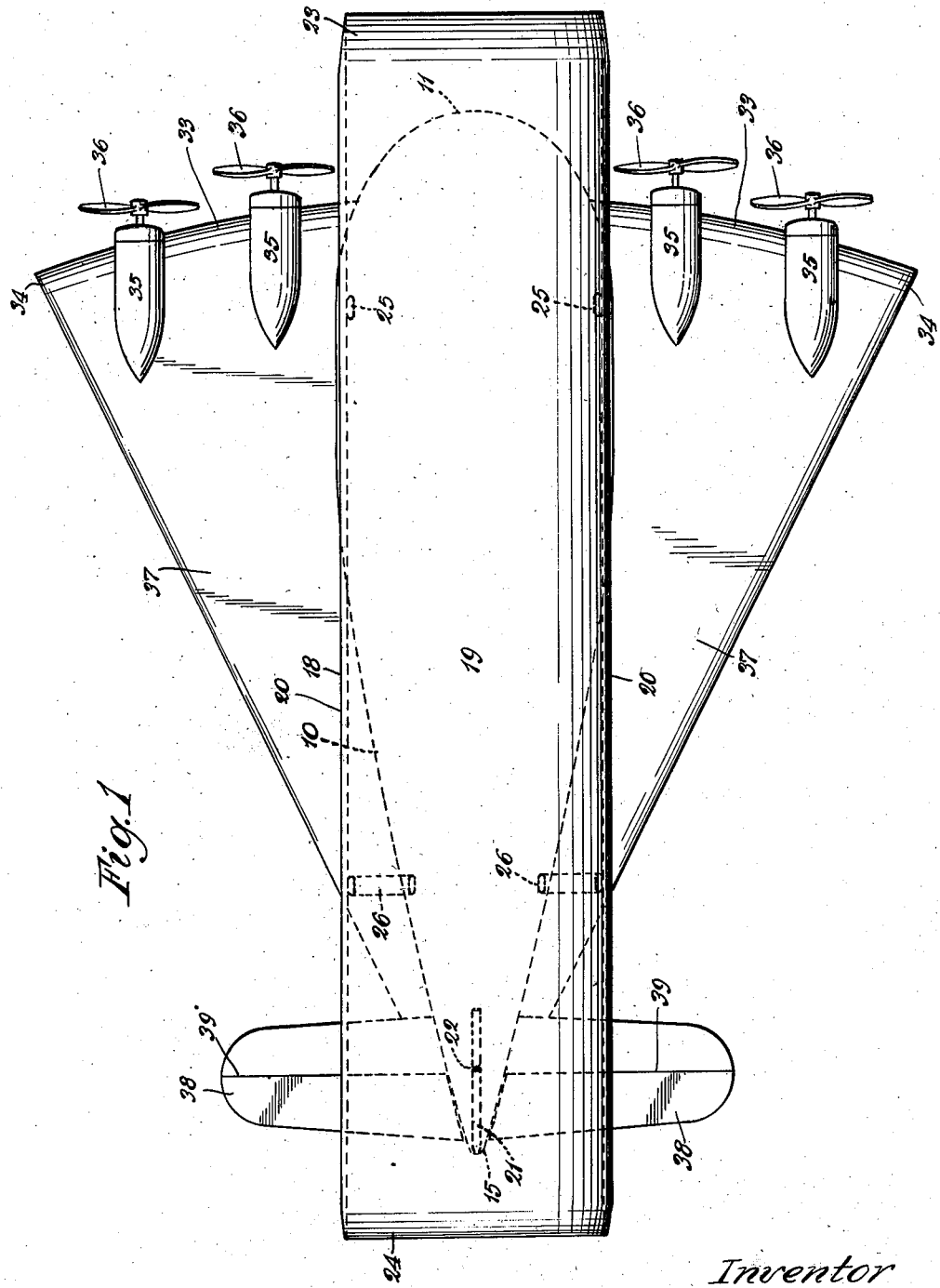

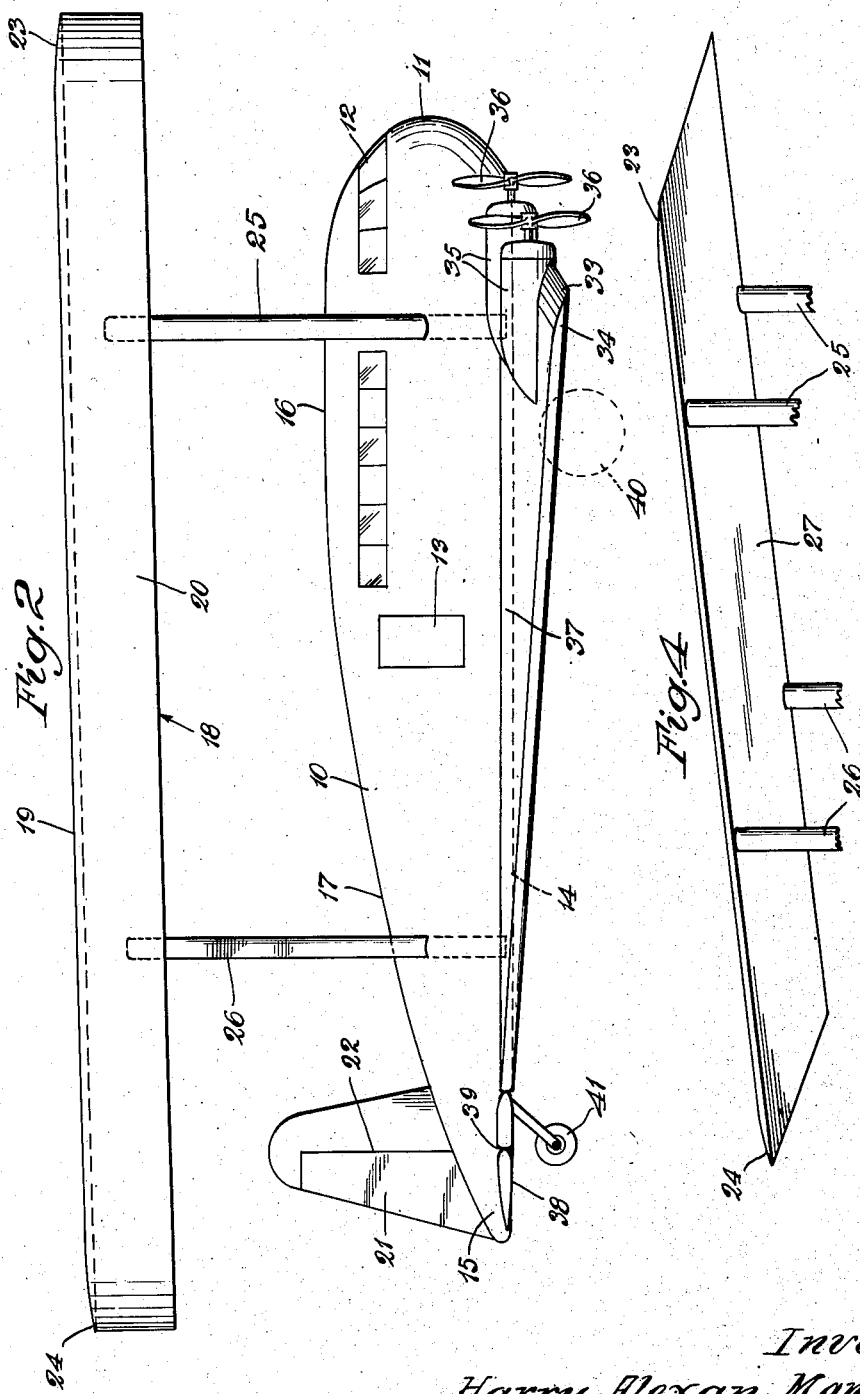

Patented June 14, 1949

2,472,856

UNITED STATES PATENT OFFICE 2,472,856

AIRPLANE

Harry Alexan Manookian, Chicago, Ill.

Application August 2, 1944, Serial No. 547,673

1 Claim. (Cl. 244—13)

My invention relates to aeroplanes and among the objects thereof is to provide a novel construction and arrangement of planes, or sustaining surfaces above and at the sides of the body or fuselage which provides a minimum width therefor, with maximum sustaining surface, eliminates wide wing spread, usually provided in aeroplanes which usually renders the plane easy to get off balance and difficult to maneuver, take off and land, whereas the present construction renders the plane easier to manipulate, balance, and steer, as well as less susceptible of breaking down or collapsing under a load, sustained weight or resistance and stresses in flight, ascent or descent, and less vulnerable to being shot away in battle from the guns of other planes, or ground crews, including flak, incendiaries, or otherwise, because the shooting target is very much limited.

Another object is to provide an airplane with a large load-sustaining surface or plane above and lengthwise of the body and, also, laterally from the sides thereof at a suitable elevation, preferably at the bottom and cooperating therewith to form a single supporting surface, thus providing a machine of the biplane type of such arrangement without sacrificing maneuverability and execution of stratagem in flight, in taking off, and in landing, and at the same time, permitting of a large, wide body or fuselage and cabin, which when armored, or properly covered or protected by bullet or shell-resisting plate or other suitable material, will render the occupants, such as navigator, pilot, operators, gunners, etc. or passengers, safer in flight, or otherwise, and especially in combat and from destruction, than they are with present constructions, or types having wide wing spread, such as due to the wings being shot away, destroyed, fired, or collapsing under damage or load when mutilated, or in carrying large gasoline or other fuel, oil, or other supplies.

Another object is to provide a novel, efficient, strong, rigid, and readily accessible construction, and especially motor and propelling supporting means located in echelon or stepped at each side from the cabin rearwardly, and laterally to give greater propelling efficiency, especially in a machine of the puller type.

Another object is to provide a supporting surface in conjunction with the body or fuselage, which supporting surface or plane extends longitudinally and lends itself to rigid mounting in addition to being protected, especially from below by the body, and at the same time gives efficient sustaining power, as well as lifting efficiency, due to the air pressure force of the aerofoil or otherwise.

Another object is to provide supporting surfaces in the form of wings on the fuselage and which may cooperate with the latter to form a single supporting surface which may be concaved at the bottom or arched upwardly for greater strength, and in which the wings on the fuselage mount and easily sustain the motors with propellers, said wings or planes being of somewhat dihedral form and rearwardly tapered segmental shape to give efficient strength and lifting or sustaining surface in conjunction with a plane above the body, but with minimum wing spread and maximum lifting force, but less vulnerable to attack with reference to the body and occupants of the same and cabin thereof, but readily accessible in making egress and ingress, as well as to the motors and propellers, but adaptable to aerofoil or other construction for the planes or wings in accordance with known and established principles.

A further object is to provide an aeroplane which somewhat simulates a bat and lends itself to greater all-around efficiency and a larger and wider fuselage or body and cabin and increases the range of vision at the sides for the pilot and navigator, as well as gunners, without excess weight, and with greater load-carrying efficiency and maneuverability.

Further objects and advantages will appear and be brought out more fully in the following specification, reference being had to the accompanying drawings, in which:

Fig. 1 is a top plan view of an aeroplane constructed in accordance with my invention.

Fig. 2 is a side elevation thereof.

Fig. 3 is a front elevation.

Fig. 4 is a perspective view, showing a different form of upper plane.

Fig. 5 is a perspective view of another form of upper plane, and

Fig. 6 is an enlarged fragmentary sectional view taken on the line 6—6 of Fig. 5.

The aeroplane is shown as comprising a suitably covered or armored body or fuselage 10, shown of streamline form, tapered rearwardly from a blunt rounded nose 11, including the cabin, having suitable windows 12, which may be bullet-proof and one or more side doors 13 for making ingress and egress to and from the interior of the body and cabin. As illustrated, the body is comparatively wide at the bottom or lower part with a relatively flat bottom which may be slightly arched or concaved upwardly, as indicated at 14.

The upper portion is arched, rounded, or convexed upwardly in concentric or eccentric form, with the lower portions of the sides bulged outwardly, if desired. The bottom 14 is substantially flat and rectilinear from the front to the rear end or tail 15, while the top of the cabin is substantially parallel thereto and of uniform height for a portion of its length above the convexly rounded front portion or nose 11, as indicated at 16, and then convexly tapered rearwardly, as at 17 to the tip of the tail 15, which is positioned centrally of the width of the streamlined body, and plane as a whole.

The upper plane, as shown in Figs. 1, 2 and 3, is indicated at 18, and is of an inverted U-shaped or channel shaped formation, with a convex top 19 and depending sides or flanges 20; of aerofoil or other section, including a frame structure suitably covered, or otherwise. This plane extends longitudinally above the body and is slightly inclined rearwardly, but of such a length as to extend slightly forwardly of the nose of the body and rearwardly of the tail, which is provided with a horizontally movable vertical steering rudder 21, adapted to be turned by any suitable means or operating connection at its axis 22 by means extending to the cabin at the operator or pilot, as is common in the art.

The front end or leading edge of the plane 18 may be tapered or beveled, as indicated at 23, preferably with a relatively long taper on the top, that is, beveled from the top to the bottom, and forward edge. The rear edge may be slightly tapered or beveled, as indicated at 24. This upper plane is supported from the body by suitable struts or braces 25 near the front of the cabin, but spaced rearwardly therefrom and shown extending from the sides of the body upwardly in substantially parallel relation for connection to the sides 20 of the upper plane at the inside, or otherwise, in any suitable manner.

Any number of braces or struts may be provided and these may include other struts or braces 26, which are similarly secured to the sides of the upper plane and extend downwardly in convergent or angular relation to the sides of the body near its narrow rear portion for suitable attachment thereto as are the braces 25 and somewhat closer together or narrower than at the front.

This plane is of substantially the same width as the body at its widest part and may be slightly wider or slightly narrower, but preferably the former, and permits the use of a relatively wide body or fuselage and cabin which serves as protection for the plane from beneath in combat and renders the upper plane less vulnerable to destruction or being shot away than the ordinary wide spread wings, while giving efficient and large sustaining surface.

It should be noted that the plane is relatively rectangular and elongated with right-angular corners including the tapered leading or entering edge and the following or trailing edge, but inclined rearwardly to give greater sustaining power, lifting or aerofoil force due to the air pressure caused by motion through the air, thereby not only giving greater maneuverability, but efficient sustaining surface in flight and lifting power in taking off and landing.

As shown in Fig. 4, the upper plane 27 may be rectangular and flat instead of inverted, U-shaped, or of concavo-convex cross-section with sides as in the form previously described. However, this flat plane 27 is substantially of the same length and width or transverse dimension in plan as the plane 18 and similarly supported by the braces or struts 25 and 26 and the front or leading edge and the rear or trailing edge 23 and 24 respectively, are of the same formation as in connection with the plane 18.

In Figs. 5 and 6 of the drawings, another form of upper plane is illustrated which is continuously curved in an upward arch of concavo-convex cross-section, as indicated at 28. In other words, this plane is of less curvature than the plane 18 and has no depending sides, but parallel opposite straight edges facing substantially horizontally instead of vertically, or otherwise. The plane is supported by similar struts or braces from the body, fuselage, or framework thereof, and the leading and trailing edges are correspondingly tapered.

This plane, as well as the other planes, may, also, be made of open frame construction, somewhat like an aerofoil, and with flat or curved surfaces as described, but, as shown in Fig. 6, it may have top and bottom coverings 29 and 30 over a frame structure 31 tapering to the front or leading edge 23. In other words, there may be a single or double surface above and below ribs, wing bars, etc.

The lower supporting surfaces, or surface, is constituted by the bottom of the body, which may be relatively flat, concaved or arched, as previously described, in connection with oppositely extending supporting members or planes 32, in the form of wings of segmental shape, tapering rearwardly, and arched or curved with the bottom of the body or flat, as desired, but preferably on an arc corresponding to the curvature of the front or leading edge or edges thereof, as indicated at 33, which is tapered or beveled downwardly from the top to the bottom, and may be of single- or double-walled formation, or such type of surface, that is, hollow or not, or with coverings above and below frame members, ribs, wing bars, or the like, as previously described.

The arc or circle in upward curvature, as well as at the front end, or leading edge, may be concentric, or eccentric, but the arcs are preferably substantially the same, or the wings may be said to extend from the sides of the body and continuous with the bottom of the body, or form the bottom or floor of the body.

The tips of the wings are, also, beveled or tapered, as indicated at 34, but may be otherwise suitably formed. This surface, while of less length or wing spread than the ordinary type of plane with wide wing spread, is shorter than required without the upper plane, and this lends greater maneuverability and renders the aeroplane, as well as the wings thereof, less liable to damage in landing or from being shot away or damaged under heavy loads or in combat, and renders the supporting surface thus produced, especially when arched, comparatively rigid and strong so as to readily support motors suitably controlled from the pilot-house or cabin, and arranged within motor fuselages or housings 35, streamlined into the wings 32 and bearing propellers 36, which may be of the pusher or pulling type, depending upon their location at the front, sides, or rear, but shown as of the puller type.

As illustrated, two of such motors and propellers are shown at each side, but any other number may be employed, either single or plural, The wings 32, considered as a whole, with the bottom of the body, form a substantially segmental structure, or sector shape, and this is, also, true of each wing or supporting surface 32 individually at each side of the rearwardly tapered streamlined body. They may, also, be located at any elevation upon the sides of the body, but preferably underslung, or located at the bottom thereof, instead of overslung, and may be horizontal or inclined forwardly or rearwardly, although the outer edges thereof, as well as the front edges, slope downwardly in the formation shown, but the inner edges are aligned with the bottom or flooring of the body represented at 37.

At the rear or tail end of the body, and the planes 32, which may be truncated in plan, or cut off instead of extending to a point, or apex, which may or may not form the center of the arc or curvature of the leading edge or edges of the bottom plane or planes, and supporting surface, or surfaces formed thereby, may be independent of the body, and extend therefrom, while terminating forwardly of and spaced from the tail end of the body with their rear ends or trailing edges extending transversely.

At this point, adjacent the axis or vertical spindle 22 of the vertically extending rudder 21 for horizontal steering, horizontally pivoted ailerons or horizontal rudders 38 are provided for vertical steering and to maintain the equilibrium of the machine, as well as in ascending and descending in flight, and in taking off, or landing, in connection with the rudder 21, which is used in conjunction therewith for making turns or banking in connection with landings, or otherwise.

The rudders 38 are mounted on one or more pivots or spindles 39 suitably braced in the floor or bottom of the body at the tail and beneath the rudder 21 and provided with suitable operative connections for manipulation from the cabin, as is common in the art. In addition, a front landing gear 40 and a rear landing gear or wheel 41 are provided beneath the bottom of the machine or fuselage thereof, and may be of any known type, or retractable with the usual brakes, or otherwise.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to secure by Letters Patent is:

In an aircraft of the character described, the combination of: a fuselage of a generally elongated formation defined by a slightly concave bottom with convex sides merging in with a curved top, said fuselage including a nose at one end and a tapered tail at the other with a main body portion of uniform cross section therebetween, the cross section of said main body portion being the maximum cross section of said fuselage; an upper plane carried by and positioned above said fuselage in spaced relation with respect thereto, said plane being of a generally rectangular formation and having a width substantially corresponding to the width of said maximum cross section and a length greater than the length of said fuselage whereby said plane projects beyond the nose and tail thereof at its respective ends; and a pair of wings extending from the opposite side edges of said fuselage bottom, each of said wings having a curvature substantially corresponding to that of said concave bottom and of which it is a continuation, an arcuate swept back leading edge which joins the fuselage bottom substantially where said nose merges with said main body portion, and a side edge extending from the free end of said leading edge to said tail.

HARRY ALEXAN MANOOKIAN.

REFERENCES CITED

The following references are of record in the file of this patent:

UNITED STATES PATENTS

| Number | Name | Date |
|---|---|---|
| 981,185 | Fowler | Jan. 10, 1911 |
| 982,290 | Moore | Jan. 24, 1911 |
| 1,119,632 | Oster et al. | Dec. 1, 1914 |
| 1,455,801 | Morse | May 22, 1923 |
| 1,579,654 | Harpstrite | Apr. 6, 1926 |
| 1,667,002 | Hall | Apr. 24, 1928 |
| 1,680,523 | Jones | Aug. 14, 1928 |

FOREIGN PATENTS

| Number | Country | Date |
|---|---|---|
| 18,715 | Great Britain | Jan. 1, 1914 |
| 422,728 | France | Jan. 27, 1911 |
| 495,880 | France | July 15, 1919 |